United States Patent
Chiu

(10) Patent No.: US 9,529,947 B1
(45) Date of Patent: Dec. 27, 2016

(54) REGISTER RETIMING AND VERIFICATION OF AN INTEGRATED CIRCUIT DESIGN

(71) Applicant: Altera Corporation, San Jose, CA (US)

(72) Inventor: Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 37 days.

(21) Appl. No.: 14/525,948

(22) Filed: Oct. 28, 2014

(51) Int. Cl.
*G06F 17/50* (2006.01)

(52) U.S. Cl.
CPC ....... *G06F 17/5031* (2013.01); *G06F 17/5018* (2013.01); *G06F 2217/62* (2013.01); *G06F 2217/84* (2013.01)

(58) Field of Classification Search
CPC .............. G06F 17/5031; G06F 17/5018; G06F 2217/62; G06F 2217/84
See application file for complete search history.

(56) References Cited

U.S. PATENT DOCUMENTS

| | | | |
|---|---|---|---|
| 6,691,286 B1 * | 2/2004 | McElvain | G06F 17/5022 702/109 |
| 7,120,833 B2 | 10/2006 | Kinderman et al. | |
| 7,203,915 B2 * | 4/2007 | Baumgartner | G06F 17/504 716/113 |
| 7,689,955 B1 | 3/2010 | van Antwerpen et al. | |
| 8,099,703 B1 * | 1/2012 | Manovit | G06F 17/504 716/103 |
| 8,539,406 B2 | 9/2013 | Mahar et al. | |
| 8,806,399 B1 | 8/2014 | van Antwerpen et al. | |
| 8,863,059 B1 * | 10/2014 | Fung | G06F 17/5054 716/108 |
| 2009/0300563 A1 * | 12/2009 | Moon | G06F 17/5031 716/106 |
| 2010/0058261 A1 * | 3/2010 | Markov | G06F 17/5045 716/106 |

* cited by examiner

*Primary Examiner* — Naum B Levin
(74) *Attorney, Agent, or Firm* — Jason Tsai

(57) ABSTRACT

A circuit design description may have registers and combinational gates. Circuit design computing equipment may perform register retiming on the circuit design description, whereby registers are moved across combinational gates, information about the register moves are recorded, and ultimately a modified circuit design description is created. The circuit design computing equipment may perform sequential equivalence checking to ensure that the circuit design description and the modified circuit design description are sequentially equivalent. To facilitate the sequential equivalence checking, the circuit design computing equipment may augment the two circuit design descriptions based on the information recorded during register retiming.

23 Claims, 9 Drawing Sheets

REGISTER RETIMING AND VERIFICATION OF AN INTEGRATED CIRCUIT DESIGN

BACKGROUND

This invention relates to integrated circuits and, more particularly, to performing sequential equivalence checking aware register retiming of an integrated circuit design.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which have led to performance increases.

To further increase the performance, solutions such as register retiming have been proposed, where registers are moved among portions of combinational logic, thereby achieving a more balanced distribution of delays between registers and thus potentially a higher clock frequency at which the integrated circuit may be operated.

However, performing register retiming may be complicated and error prone, especially when different portions of the integrated circuit operate in different clock domains and registers have different clocks, clock polarity, or particular reset, preset, or initialization constraints. Verifying that the pre-register retiming circuit design has the same behavior as the post-register retiming circuit design is desirable.

SUMMARY

In accordance with certain aspects of the invention, a circuit design computing equipment may receive a first circuit design description with primary inputs, primary outputs, and a combinational gate. The combinational gate may have an output port. The circuit design computing equipment may perform register retiming on the first circuit design description to create a second circuit design description having the primary inputs, primary outputs, and the combinational gate. If desired, the circuit design computing equipment may augment the first and second circuit design descriptions in preparation for performing sequential equivalence checking. As an example, the augmented first and second circuit design descriptions may each have an additional primary output that is coupled to the respective output port of the combinational gate.

It is appreciated that the present invention can be implemented in numerous ways, such as a process, an apparatus, a system, a device, or a method on a computer readable medium. Several inventive embodiments of the present invention are described below.

In certain embodiments, the above-mentioned circuit design computing equipment may move a register across the combinational gate by removing the register from the output port of the combinational gate and adding the register to an input port of the combinational gate.

If desired, the circuit design computing equipment may move a register across the combinational gate by removing the register from an input port of the combinational gate and adding the register to the output port of the combinational gate.

If desired, the circuit design computing equipment may record information about the register that is moved across the combinational gate. Such information may include a move direction and a register type such as a signal value stored in the register at initialization (e.g., after power-up), a clock identifier, and a polarity.

Further features of the invention, its nature and various advantages, will be more apparent from the accompanying drawings and the following detailed description of the preferred embodiments.

DETAILED DESCRIPTION

The present invention relates to integrated circuits and, more particularly, to performing sequential equivalence checking aware register retiming of an integrated circuit design.

Performing register retiming to improve the performance of an integrated circuit design may be complicated and error prone, especially when different portions of the integrated circuit design operate in different clock domains and registers have different clocks, clock polarity, and/or particular reset, preset, or initialization constraints. Therefore, verifying that the pre-register retiming circuit design has the same behavior as the post-register retiming circuit design is generally desirable.

As an example, consider a circuit design with primary inputs (PI), primary outputs (PO), and internal nodes in which primary inputs (PI) have no fan-in from internal nodes and primary outputs (PO) don't fan-out to internal nodes. Then, sequential equivalence checking may prove or disprove that all primary outputs of two versions of a same circuit design have the same behavior if the same signals were applied to the primary inputs. For this purpose and in an effort to simplify and thus speed up the verification process, sequential equivalence checking may partition the circuit design description into sub-circuits that are identified by internal nodes and compare the behavioral equivalence of those internal nodes of the circuit designs. However, performing register retiming may change the behavior of many internal nodes (e.g., by moving one or more registers across an internal node), thereby eliminating those internal nodes for the purpose of simplifying sequential equivalence checking. As a result, sequential equivalence checking can rely on only a few internal nodes, which may result in a significant increase in the complexity of sequential equivalence checking.

It may therefore be desirable to perform sequential equivalence checking aware register retiming, for example by recording information about the registers that are moved during register retiming and instrumenting the respective circuit design descriptions to facilitate sequential equivalence checking.

It will be recognized by one skilled in the art, that the present exemplary embodiments may be practiced without some or all of these specific details. In other instances, well-known operations have not been described in detail in order not to unnecessarily obscure the present embodiments.

Figure 1:
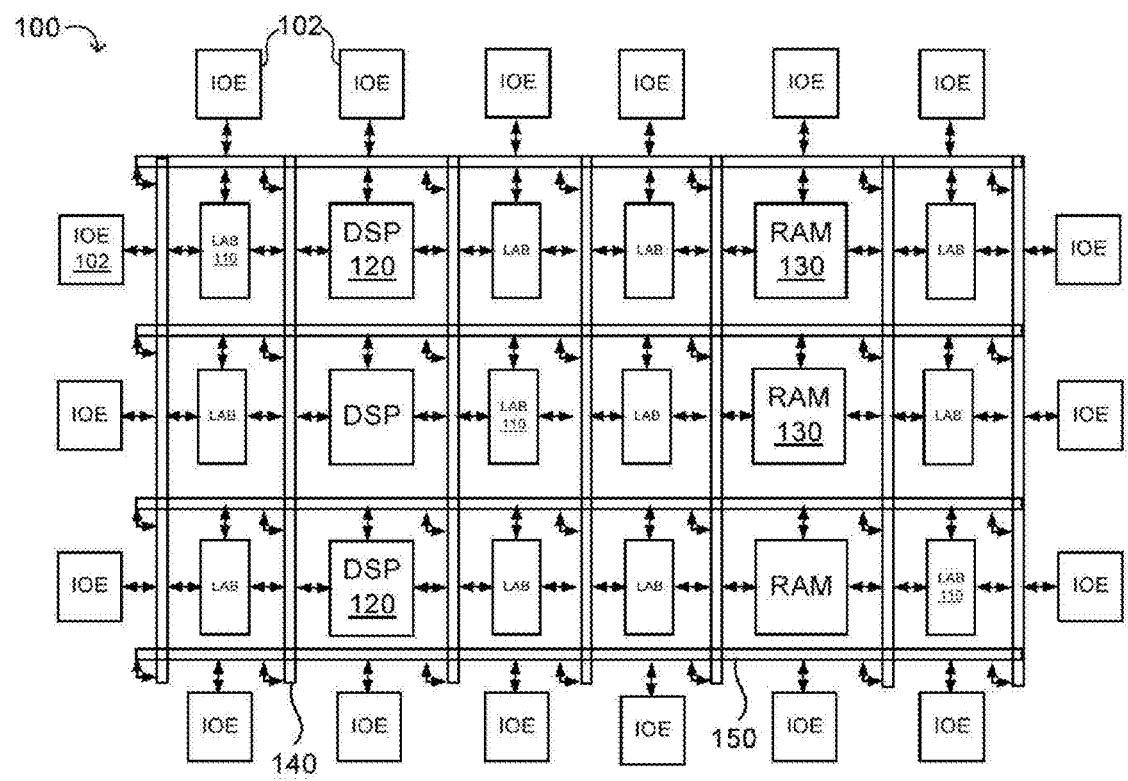
FIG. 1 is a diagram of an illustrative integrated circuit having an exemplary routing topology in accordance with an embodiment.

An illustrative embodiment of an integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
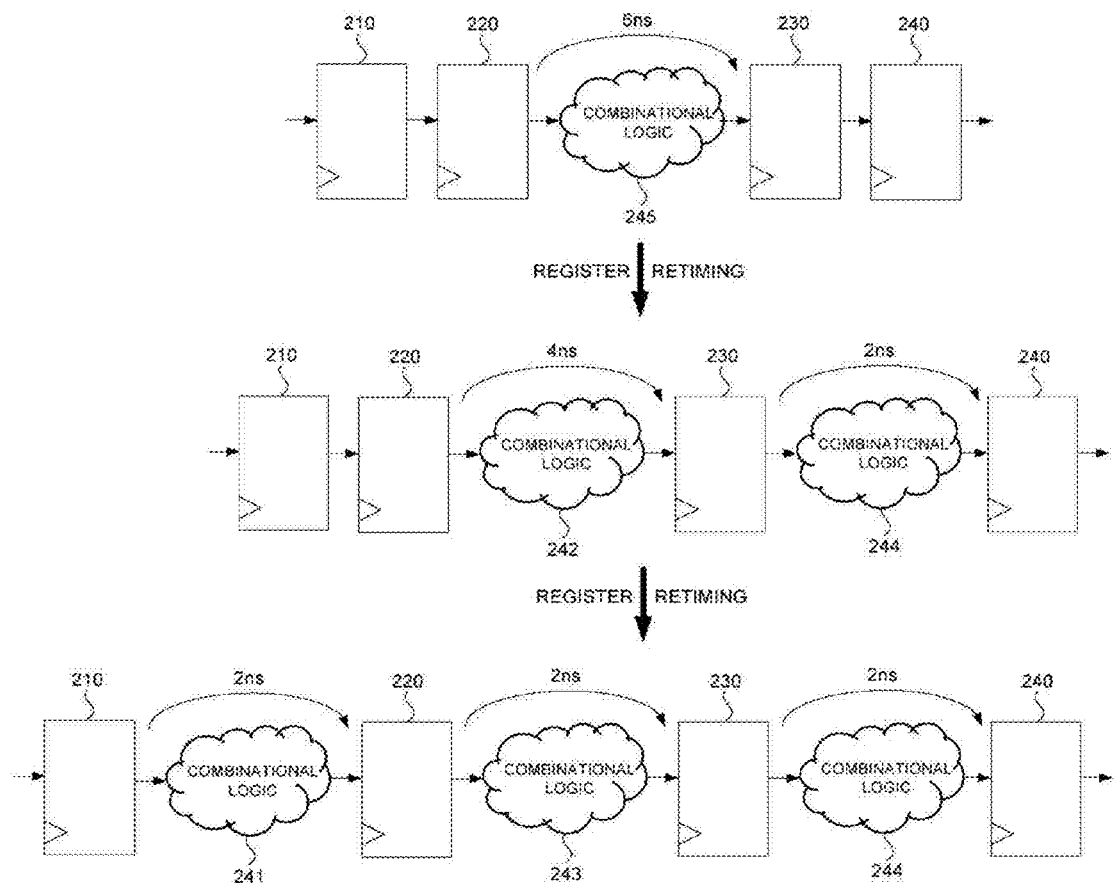
FIG. 2 is a diagram of an illustrative retiming operations in accordance with an embodiment.

FIG. 2 shows an example of different versions of a circuit design that PLD 100 may implement. The first version of the circuit design may include registers 210, 220, 230, 240, and combinational logic 245. Register 210 may send a signal to register 220; register 220 may send the signal through combinational logic 240 to register 230; and register 230 may send the signal to register 240. As an example, the delay on the path from register 220 through combinational logic 245 to register 230 may have a delay of 6 ns (nanoseconds), whereas the delay between register 210 and 220 and between registers 230 and 240 may have a delay of 0 ns. Thus, the first version of the circuit design may operate at a frequency of 166 MHz.

Performing register retiming on the first version of the circuit design may create the second version of the circuit design. For example, register 230 may be pushed back through a portion of combinational logic 245, thereby separating combinational logic 245 of the first version of the circuit design into combinational logic 242 and 244 of the second version of the circuit design. In the second version of the circuit design, register 210 may send a signal to register 220; register 220 may send the signal through combinational logic 242 to register 230; and register 230 may send the signal through combinational logic 244 to register 240.

As an example, the delay on the path from register 220 through combinational logic 242 to register 230 may have a delay of 4 ns, and the delay from register 230 through combinational logic 244 to register 240 may have a delay of 2 ns. Thus, the second version of the circuit design may operate at a frequency of 250 MHz.

Performing register retiming on the second version of the circuit design may create the third version of the circuit design. For example, register 220 may be pushed forward through a portion of combinational logic 242, thereby separating combinational logic 242 of the second version of the circuit design into combinational logic 241 and 243 of the third version of the circuit design. In the third version of the circuit design, register 210 may send a signal through combinational logic 241 to register 220, register 220 may send the signal through combinational logic 243 to register 230, and register 230 may send the signal through combinational logic 244 to register 240.

As an example, the delay on the paths from register 210 through combinational logic 241 to register 220, from register 220 through combinational logic 243 to register 230, and from register 230 through combinational logic 244 to register 240 may all have a delay of 2 ns. Thus, the third version of the circuit design may operate at a frequency of 500 MHz, which is thrice the frequency at which the first version of the circuit design may operate.

Figure 3:
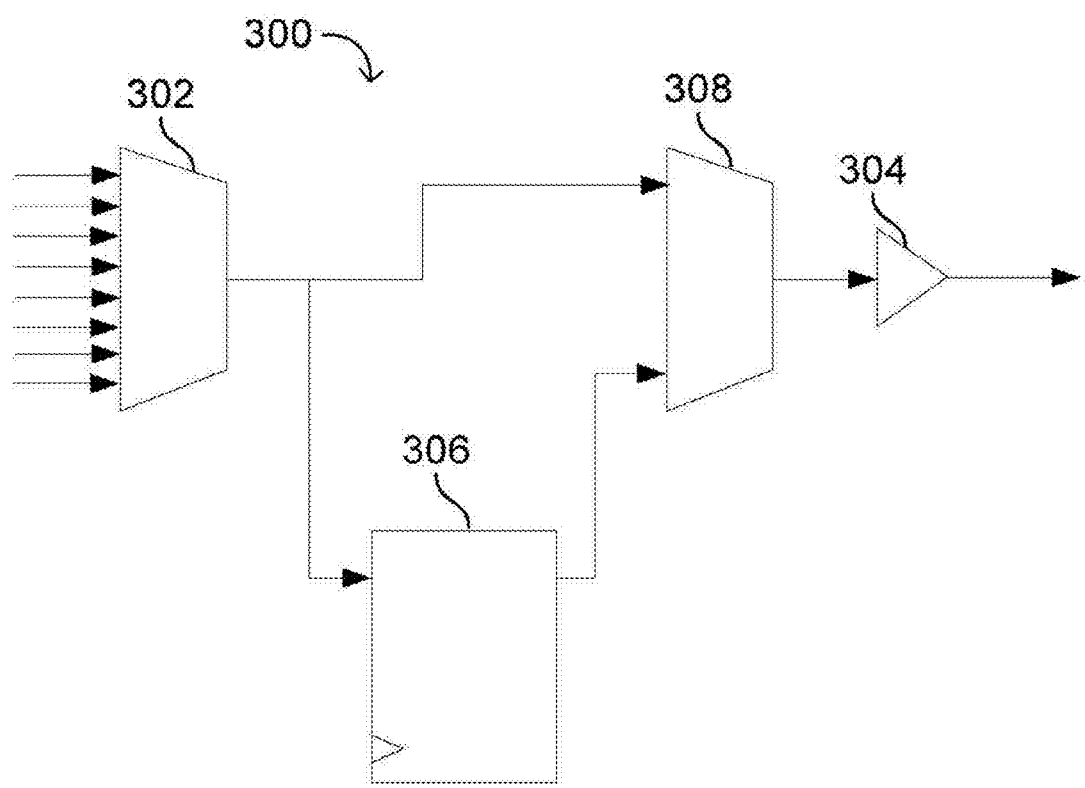
FIG. 3 is a diagram of an illustrative pipelined routing resource which uses a register to pipeline a routing signal in accordance with an embodiment.

If desired, routing resources such as the vertical routing channels 140 or the horizontal routing channels 150 of FIG. 1 may include pipeline elements, which can facilitate register retiming. FIG. 3 depicts a pipelined routing resource 300 which uses a register in accordance with an embodiment. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives the wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, in accordance with an embodiment of the invention, the multiplexer 302 may be pipelined by providing its output to the data input of register 306. Multiplexer 308 in the pipelined routing resource 300 may receive the output of multiplexer 302 directly and may also receive the data output from register 306.

Although the pipelined routing resource 300 includes a register, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 308 selects the direct output of multiplexer 302.

In the pipeline mode, multiplexer 308 may select the output of register 306. Multiplexer 308 may provide its output to driver circuit 304, and the output of driver circuit 304 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constrained to operate with a 650 ps clock cycle. Thus, providing a pipeline register such as register 306 every fourth wire may be sufficient in this example. Alternatively the registers may be placed more frequently than every fourth wire (e.g., every second wire) to provide a higher degree of freedom in selection of which registers are used.

Pipelined routing resources such as pipelined routing resource 300 may facilitate register retiming operations, such as the register retiming illustrated in FIG. 2. For example, consider the scenario in which register 230 is implemented by a first instance of a pipelined routing element that is operated in pipeline register mode (i.e., register 230 is implemented by register 306 of a first instance of a pipelined routing resource 300). Consider further that the path from register 220 through combinational logic 245 to register 230 includes a second instance of a pipelined routing element that is operated in non-pipeline mode. Thus, switching the first instance of the pipelined routing element from operating in pipeline register mode to operating in non-pipeline mode and switching the second instance of the pipelined routing element from operating in non-pipeline mode to operating in pipeline register mode may transform the first version into the second version of the circuit design presented in FIG. 2.

CAD tools in a circuit design system may evaluate whether register retiming may improve the performance of a current version of a circuit design or whether the current version of the circuit design meets a given performance criterion. If desired, and in the event that the CAD tools determine that register retiming would improve the performance of the current version of the circuit design or that the current version of the circuit design misses the given performance criterion, the CAD tools may execute register retiming operations that transform the current version of the circuit design into another version of the circuit design (e.g., as illustrated in FIG. 2).

Figure 4:
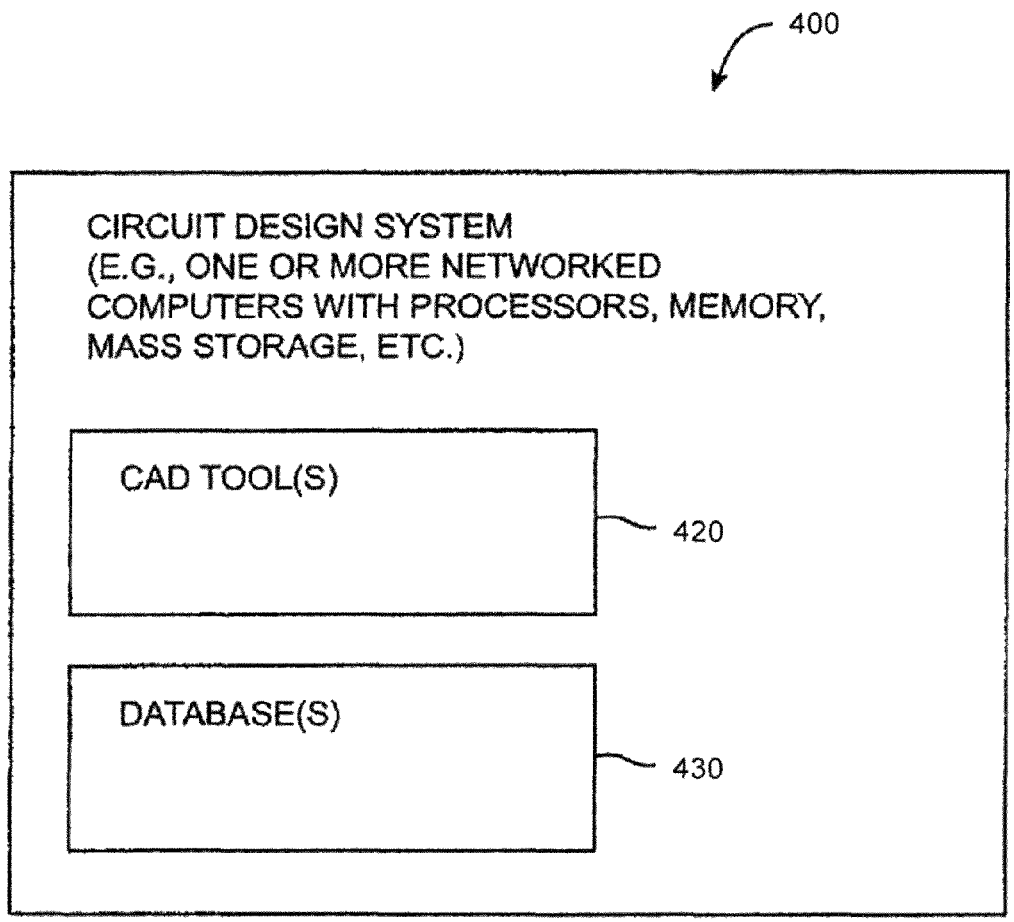
FIG. 4 is a diagram of a circuit design system that may be used to design integrated circuits in accordance with an embodiment.

An illustrative circuit design system 400 in accordance with an embodiment is shown in FIG. 4. System 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 5:
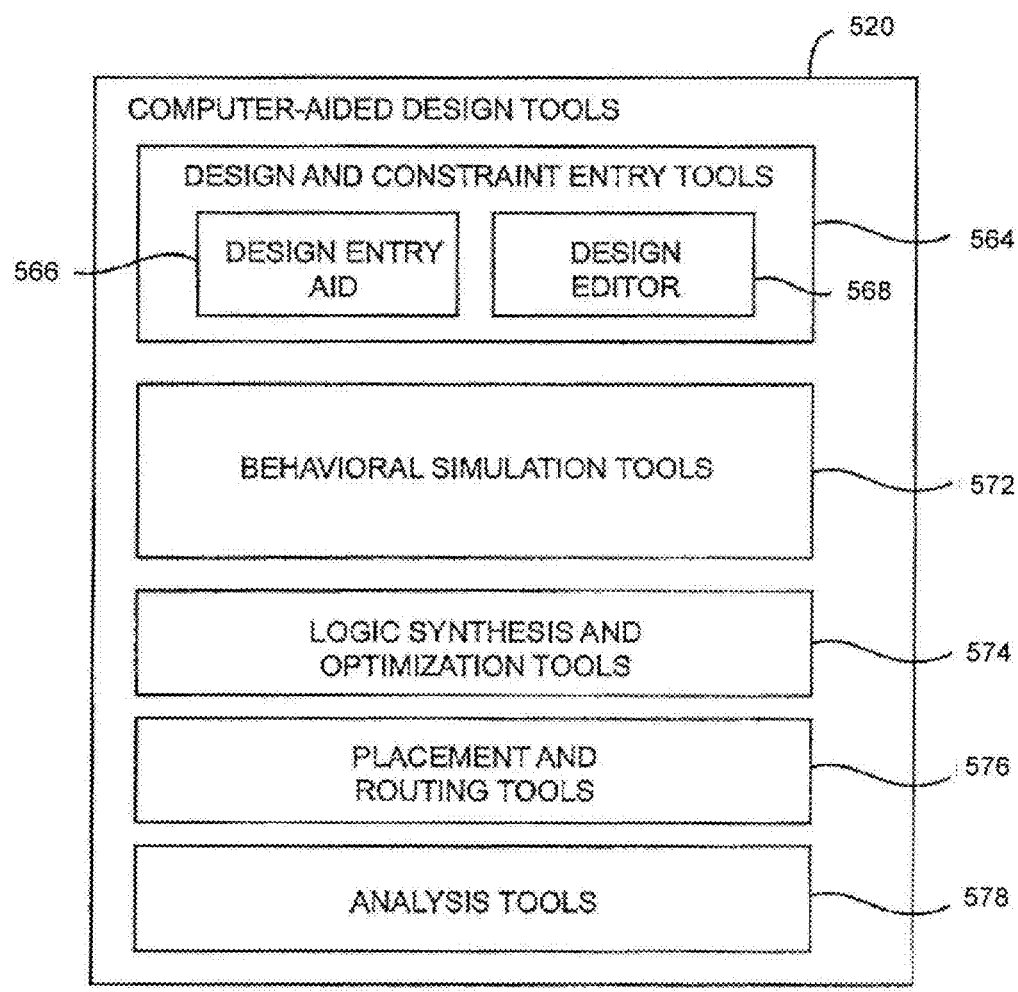
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564. As an example, logic synthesis and optimization tools 574 may perform register retiming on the circuit design based on the length of a combinational path between registers in the circuit design and corresponding timing constraints that were entered by the logic designer using tools 564.

After logic synthesis and optimization using tools 574, the circuit design system may use tools such as placement and routing tools 576 to perform physical design steps (layout synthesis operations). Placement and routing tools 576 are used to determine where to place each gate of the gate-level netlist produced by tools 574. For example, if two counters interact with each other, the placement and routing tools 576 may locate these counters in adjacent regions to reduce interconnect delays or to satisfy timing requirements specifying the maximum permitted interconnect delay. The placement and routing tools 576 create orderly and efficient implementations of circuit designs for any targeted integrated circuit (e.g., for a given programmable integrated circuit such as a field-programmable gate array (FPGA).)

Tools such as tools 574 and 576 may be part of a compiler suite (e.g., part of a suite of compiler tools provided by a programmable logic device vendor). In accordance with the present invention, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and 576 may perform register retiming by moving registers through combinational logic (e.g., through logical AND, OR, XOR, etc. gates, look-up tables (LUTs), multiplexers, arithmetic operators, etc.). Tools 574 and 576 may push registers forward or backward across combinational logic as illustrated in FIG. 2. If desired, tools 574 and 576 may perform forward and backward pushes of registers by configuring pipelined routing resources such as pipelined routing resource 300 of FIG. 3 to operate in non-pipeline mode or as a pipelined routing element.

After an implementation of the desired circuit design has been generated using placement and routing tools 576, the implementation of the design may be analyzed and tested using analysis tools 578. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

Figure 6:
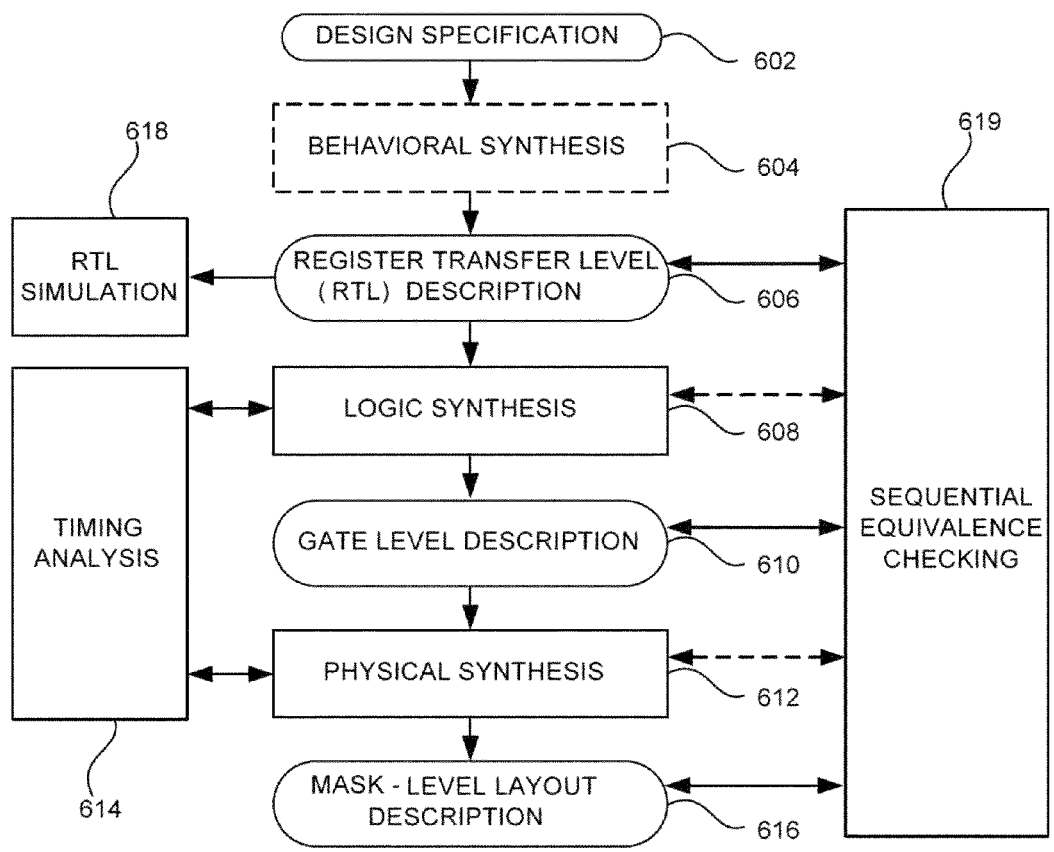
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6. As shown in FIG. 6, a circuit designer may first provide a design specification 602. The design specification 602 may, in general, be a behavioral description provided in the form of an application code (e.g., C code, C++code, SystemC code, OpenCL code, etc.). In some scenarios, the design specification may be provided in the form of a register transfer level (RTL) description 606.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few.

In certain embodiments, a given data path may have more than one constraint associated with the path, and some of these constraints may be in conflict with each other e.g., a constraint received with the behavioral design specification for a given path may conflict with the constraint received with the RTL description and with a constraint received with a constraint file. In this scenario, a predetermined priority of constraints, which may be defined explicitly or resolved implicitly by CAD tools 520, may determine which of the conflicting constraints is selected. For example, the constraint from the user or a configuration file may override the constraints received from other sources, and a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 520. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

Constraints included in design specification 602 or RTL description 606 may be conveyed to CAD tools 520 in the form of variables, parameters, compiler directives, macros, pragmas, or assertions, just to name a few. CAD tools 520 may use a constraint file, which may include a portion or all of the constraints. Such a constraint file may be included with design specification 602 or RTL description 606. In some scenarios, a portion or all of the constraints may be embedded in the circuit design. Alternatively, the constraints may have been defined using the design and constraint entry tools 564 (see FIG. 5).

At step 604, behavioral synthesis (sometimes also referred to as algorithmic synthesis) may be performed to convert the behavioral description into an RTL description 606. Step 604 may be skipped if the design specification is already provided in form of an RTL description.

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may perform register retiming as illustrated in FIG. 2 according to the constraints that are included in design specification 602 or RTL description 606.

During step 612, physical synthesis operations (e.g., place and route and optimization operations using for example placement and routing tools 576) may place and connect the different gates in gate-level description 610 in a preferred location on the targeted integrated circuit to meet given target criteria (e.g., minimize area and maximize routing efficiency or minimize path delay and maximize clock frequency or any combination thereof).

If desired, physical synthesis operations may perform register retiming as illustrated in FIG. 2 and according to the constraints that are included in design specification 602 or RTL description 606. As an example, physical synthesis operations may perform register retiming after placement and routing operations by changing the configuration of some pipelined routing resources (e.g., some instances of pipelined routing resource 300 of FIG. 3) from operating in pipeline register mode to operating in non-pipelined mode and the configuration of other pipelined routing resources (e.g., other instances of pipelined routing resources 300 of FIG. 3) from operating in non-pipelined mode to operating in pipeline register mode. The output of physical synthesis 612 is a mask-level layout description 616.

Circuit design system 400 may include a timing estimator (e.g., formed as part of optimization tools 574, tools 576, or tools 578) that may be used to estimate delays between synchronous elements of the circuit design during step 614. For example, timing estimator may estimate delays between sequential elements such as registers and storage circuits (e.g., based on the lengths of interconnects, intermediate combinational logic, etc.). The delays may, if desired, be estimated based on metrics such as slack (e.g., the difference between a required arrival time and the arrival time of a signal), slack-ratios, interconnect congestion, or other timing metrics. Circuit design system 400 may use the estimated delays to determine the locations of groups of circuitry while helping to ensure that delays satisfy timing requirements (e.g., critical path delay requirements) or other performance constraints.

Consider the scenario in which a circuit design has a given path from a register through combinational logic to another register and that this given path misses one or more target criteria. For example, the timing estimator may determine that the given path is associated with a delay that is larger than the target delay specified for the path as one of the target criteria. The timing estimator may detect that the given path has a larger delay before, during, and after logic synthesis 608 or before, during, and after physical synthesis 612, which may include operations such as clustering, partitioning, placement, and routing, just to name a few. In this scenario, logic synthesis 608 or physical synthesis 612 may perform register retiming, thereby reducing the delay through the combinational logic between the registers and potentially improving the performance of the given path.

Circuit design system 400 may include a formal verification tool (e.g., formed as part of tools 578) that may be used to perform sequential equivalence checking. Sequential equivalence checking 619 may formally verify the functional equivalence of different versions of the circuit design. As shown, sequential equivalence checking 619 may formally verify the functional equivalence of the RTL description 606, the gate level description 610, and/or the mask-level description. If desired, sequential equivalence checking 619 may compare different versions of the circuit design before and after individual optimization steps within logic synthesis and/or physical synthesis. For example, sequential equivalence checking 619 may compare the versions of the circuit design before and after register retiming during logic synthesis and/or physical synthesis.

Sequential equivalence checking 619 may prove or disprove that each primary output (PO) of two versions of a circuit design is pair-wise equivalent for all possible input sequences. Consider the scenario in which register retiming is performed on the first version of a circuit design description A, which has n primary outputs (i.e., primary outputs PO1(A), PO2(A), . . . , POn(A)). The result of the register retiming operation may be a second version of the circuit design description B, which also has n primary outputs (i.e., primary outputs PO1(B), PO2(B), . . . , POn(B)). Thus, the sequential equivalence checking problem may be reduced to proving or disproving:

$$(PO1(A) \text{ XOR } PO1(B)) \text{ OR } (PO2(A) \text{ XOR } PO2(B)) \\ \text{OR } \ldots \text{ OR } (POn(A) \text{ XOR } POn(B))=0 \qquad (1)$$

The logic OR operation applied to pairwise logic exclusive OR operations is sometimes also referred to as a "miter."

Sequential equivalence checking 619 may proceed stepwise by verifying the sequential equivalence of all physical points P (e.g., the output of registers or the inputs or outputs of logic gates) within the two versions of the circuit design description, thereby proving or disproving the sequential equivalence of all primary outputs of the two versions of the circuit design description by induction.

However, as a result of register retiming, a physical point P in version A of the circuit design description may become a physical point P' in version B of the circuit design description, and the two physical points P and P' may no longer be equivalent. To solve this problem, some number of registers N (e.g., the number of registers pushed backwards across point P) and M (e.g., the number of registers pushed forward across point P) may be added to physical points P and P', respectively, such that the physical point P registered N times (i.e., R_N(P)) is equivalent the physical point P' registered M times (i.e., R_M(P')). In other words, the logic exclusive OR operation applied to R_N(P) and R_M(P') may be zero:

$$R\_N(P) \text{ XOR } R\_M(P')=0 \qquad (2)$$

The expression of equation (2) may be added to equation (1), thereby augmenting the original miter by adding additional primary outputs. The additional primary outputs may further restrict the miter and thus demonstrating equivalence of the augmented problem may imply equivalence of the original problem.

Figure 7:
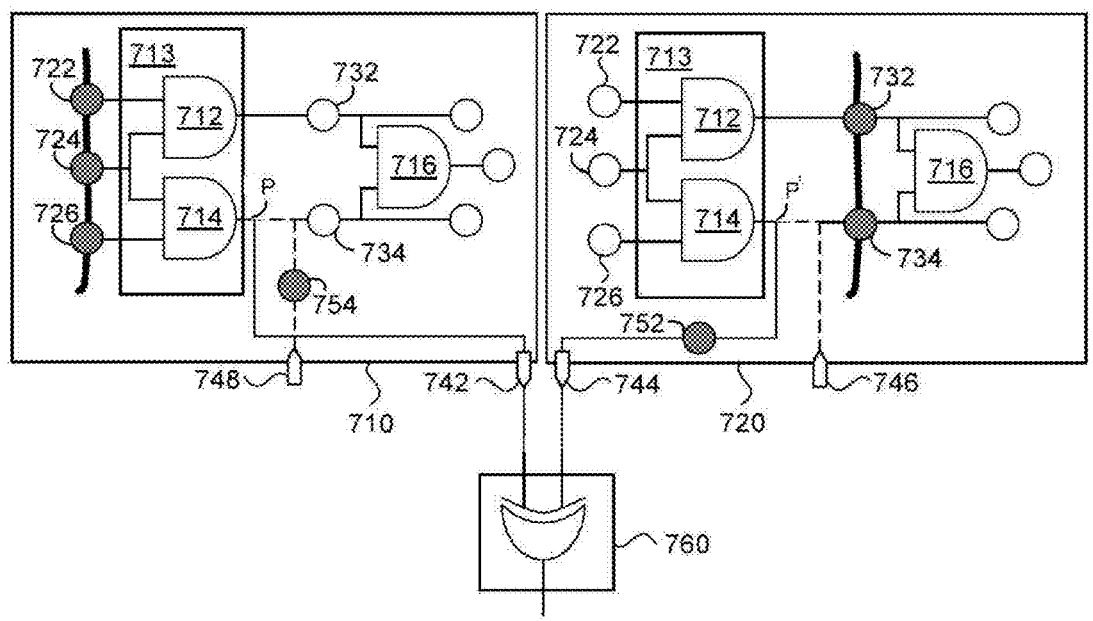
FIG. 7 is a diagram of an illustrative circuit that checks the sequential equivalence of an integrated circuit before and after a register retiming operation in accordance with an embodiment.

FIG. 7 shows two versions of a circuit design description with a logic exclusive OR operation performed between a physical point P in the first version 710 and a physical point P' in the second version 720 of the circuit design description. Versions 710 and 720 of the circuit design description may include pipelined routing resources 722, 724, 726, 732, and 734 (e.g., pipelined routing resource 300 of FIG. 3), logic AND gate 716 and combinational gate 713, which may include logic AND gates 712 and 714, respectively.

For the purpose of sequential equivalence checking, primary output 742 may be added to version 710 and primary output 744 to version 720 of the circuit design description. These additional primary outputs that were inserted into the two versions of the circuit design description for the purpose of sequential equivalence checking are sometimes also referred to as test ports.

Sequential equivalence checker 760 may verify the sequential equivalence of primary outputs 742 and 744. For example, sequential equivalence checker 760 may receive signals from primary outputs 742 and 744 and perform a logic exclusive OR operation of the signals.

Physical point P at the output of combinational gate 713 which is coupled to the output of logic AND gate 714 in version 710 may be routed to primary output 742, and physical point P' at the output of combinational gate 713 which is coupled to the output of logic AND gate 714 in version 720 may be routed to primary output 744.

As an example, consider that version 710 of the circuit design description operates pipelined routing resources 722, 724, and 726 in pipelined register mode and pipelined routing resources 732 and 734 in non-pipelined mode.

Consider further that a CAD tool (e.g., CAD tool 520 of FIG. 5) performs a register retiming operation on version 710 of the circuit design description. For example, the register retiming operation may configure pipelined routing resources 722, 724, and 726 to operate in non-pipelined mode and pipelined routing resources 732 and 734 in pipelined register mode, thereby effectively pushing registers forward across combinational gate 713 and creating version 720 of the circuit design description.

In this example, physical point P and P' and thus primary outputs 742 and 744 may no longer be equivalent after the same number of clock cycles. However, physical points P and P' may be equivalent after a different number of clock cycles. For example, physical point P' delayed by one clock cycle may be equivalent to physical point P. Thus, inserting a register (e.g., register 752) between physical point P' and primary output 744 (i.e., in the register retimed version of the circuit design description) may restore equivalency between primary outputs 742 and 744.

If desired, the circuit design may be partitioned into sub-circuit designs and sequential equivalence checking may be performed separately on each of the sub-circuit designs. Performing sequential equivalence checking on smaller sub-circuit designs may simplify each sequential equivalence checking procedure and thus speed-up the sequential equivalence checking of the entire circuit design. As an example, the output of combinational gate 713 that is coupled to logic AND gate 714 may be decoupled from pipelined routing resource 734 for the purpose of checking sequential equivalency in both versions (i.e., version 710 and 720) of the circuit design description. Primary inputs 746 and 748 may be added to versions 720 and 710, respectively, and coupled to pipelined routing resource 734. Since physical point P' and thus the input of pipelined routing resource 734 in version 720 may be delayed by one clock cycle compared to the input of pipelined routing resource 734 in version 710, register 754 may be inserted between primary input 748 and pipelined routing resource 734 in version 710 (i.e., in the original version of the circuit design description).

As another example, consider that version 720 of the circuit design description operates pipelined routing resources 732 and 734 in pipelined register mode and pipelined routing resources 722, 724, and 726 in non-pipelined mode. Consider further that a CAD tool (e.g., CAD tool 520 of FIG. 5) performs a register retiming operation on version 720 of the circuit design description. For example, the register retiming operation may configure pipelined routing resources 722, 724, and 726 to operate in pipelined register mode and pipelined routing resources 732 and 734 in non-pipelined mode, thereby effectively pushing registers backward across combinational gate 713 and creating version 710 of the circuit design description.

In this example, physical point P and P' and thus primary outputs 742 and 744 may no longer be equivalent after the same number of clock cycles. However, physical points P and P' may be equivalent after a different number of clock cycles. For example, physical point P' delayed by one clock cycle may be equivalent to physical point P. Thus, inserting a register (e.g., register 752) between physical point P' and primary output 744 (i.e., in the original version of the circuit design description) may restore equivalency between primary outputs 742 and 744.

If desired, the output of combinational gate 713 that is coupled to logic AND gate 714 may be decoupled from pipelined routing resource 734 for the purpose of checking sequential equivalency in both versions (i.e., version 710 and 720) of the circuit design description. Primary inputs 746 and 748 may be added to versions 720 and 710, respectively, and coupled to pipelined routing resource 734. Since physical point P' and thus the input of pipelined routing resource 734 in version 720 may be delayed by one clock cycle compared to the input of pipelined routing resource 734 in version 710, register 754 may be inserted between primary input 748 and pipelined routing resource 734 in version 710 (i.e., in the register retimed version of the circuit design description).

Figure 8:
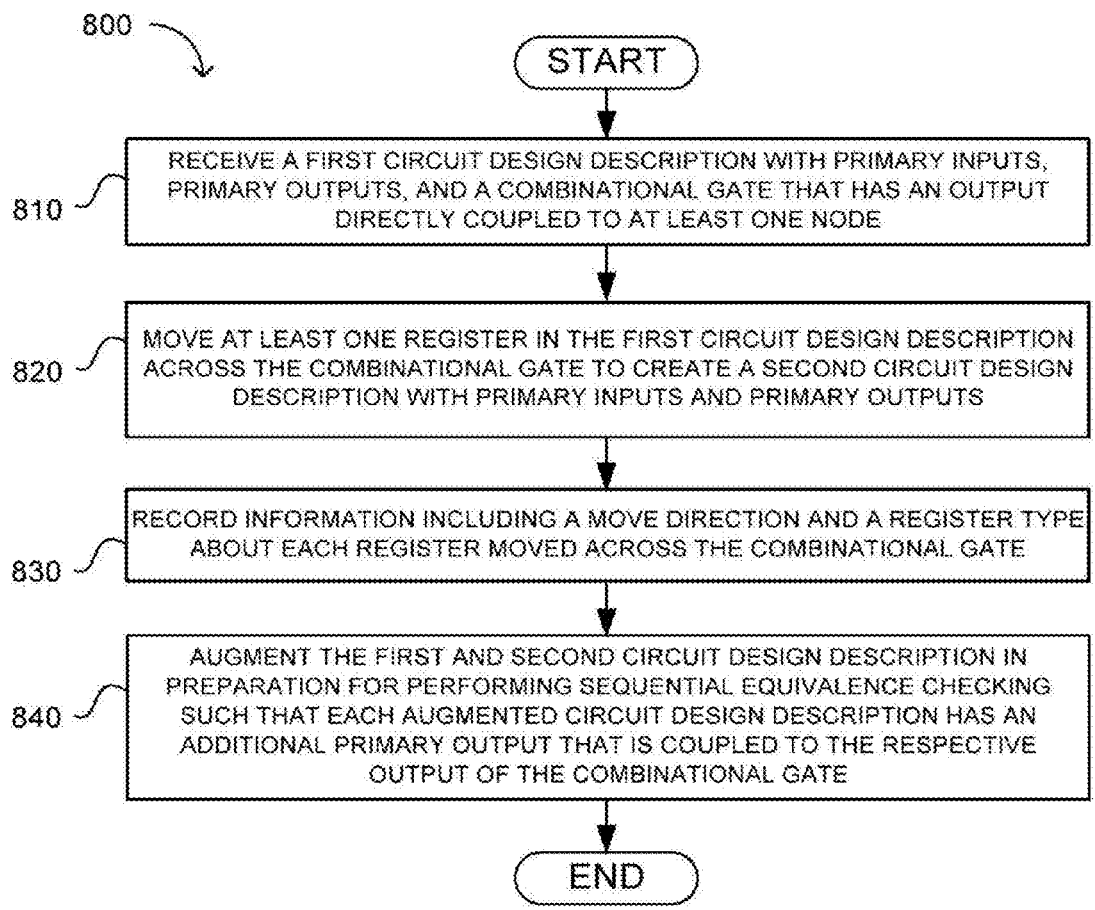
FIG. 8 is a flow chart showing illustrative steps for performing sequential equivalence checking aware register retiming operations in accordance with an embodiment.

FIG. 8 is a flow chart showing illustrative steps that a CAD tool (e.g., CAD tool 520 of FIG. 5) may perform during sequential equivalence checking aware register retiming operations similar to the register retiming operations performed on versions 710 and 720 of the circuit design description of FIG. 7.

During step 810, the CAD tool may receive a first circuit design description with primary inputs (PI), primary outputs (PO), and a combinational gate that has an output directly coupled to at least one node. During step 820, the CAD tool may move at least one register in the first circuit design description across the combinational gate to create a second circuit design description with primary inputs and primary outputs. As an example, the CAD tool may remove a register from an input of the combinational gate and add a register to an output of the combinational gate, thereby pushing a register forward across the combinational gate. As another example, the CAD tool may remove a register from an output of the combinational gate and add a register to an input of the combinational gate, thereby pushing a register backward across the combinational gate.

During step 830, the CAD tool may record information about the register retiming operation. For example, the CAD tool may record information that includes the move direction (e.g., forward or backward), the register type (e.g., initial condition such as condition on power-up, asynchronous and/or synchronous reset and/or preset, clocking information such as a clock identifier which may be a clock signal name, polarity, frequency, and phase) of each register that is moved across the combinational gate.

Figure 9:
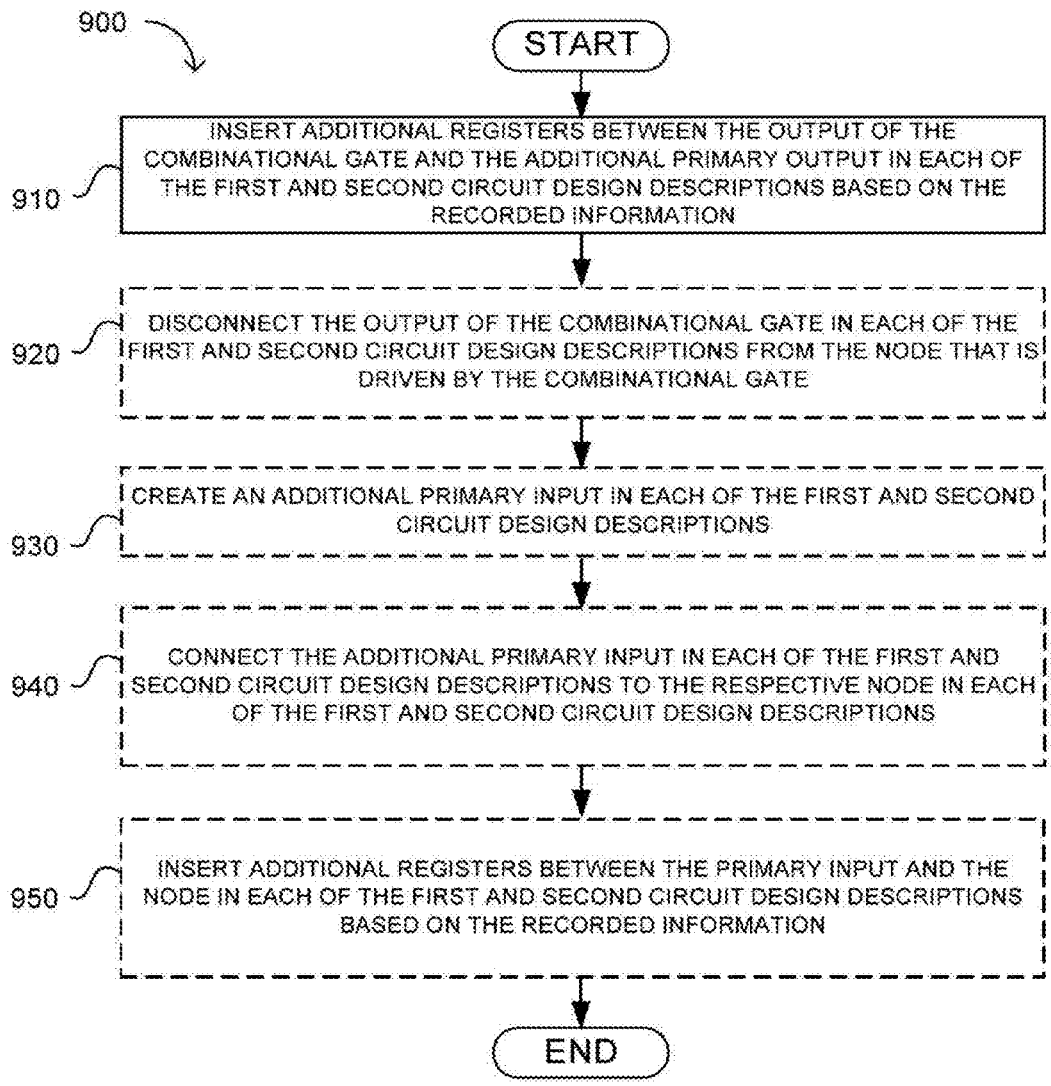
FIG. 9 is a flow chart showing illustrative steps for preparing a circuit design and the register retimed version of the circuit design for performing sequential equivalence checking in accordance with an embodiment.

During step 840, the CAD tool may augment the first and second circuit design descriptions in preparation for performing sequential equivalence checking such that each augmented circuit design description has an additional primary output that is coupled to the respective output of the combinational gate. If desired, the CAD tool may perform additional steps in preparation for sequential equivalence checking. FIG. 9 is a flow chart showing illustrative steps that a CAD tool (e.g., CAD tool 520) may perform for preparing a first version of a circuit design description and a second, register retimed version of the circuit design for sequential equivalence checking.

During step 910, the CAD tool may insert additional registers between the output of the combinational gate and the additional primary output in each of the first and second circuit design descriptions based on the recorded information. For example, in the event that the CAD tool has pushed more registers forward across the combinational gate than backward across the combinational gate, the CAD tool may insert a number of registers between the output of the combinational gate and the additional primary output of the second, register retimed version of the circuit design that is equal to the difference of forward minus backward pushed registers. As another example, in the event that the CAD tool has pushed more registers backward across the combinational gate than forward across the combinational gate, the CAD tool may insert a number of registers between the output of the combinational gate and the additional primary output of the first version of the circuit design that is equal to the difference of backward minus forward pushed registers.

During step 920, if desired, the CAD tool may disconnect the output of the combinational gate in each of the first and second circuit design descriptions from the node driven by the combinational gate. For example, the CAD tool may disconnect the logic AND gate 714 from pipelined routing resource 734 in FIG. 7. During step 930, the CAD tool may create an additional primary input in each of the first and second circuit design descriptions. For example, the CAD tool may create primary inputs 746 and 748 in version 720 and 710 of the circuit design description depicted in FIG. 7, respectively.

During step 940, the CAD tool may connect the additional primary input in each of the first and second circuit design descriptions to the respective node in each of the first and second circuit design descriptions. For example, the CAD tool may connect primary input 748 to pipelined routing resource 734 in version 710 and primary input 746 to pipelined routing resource 734 in version 720 of the circuit design description of FIG. 7.

During step 950, the CAD tool may insert additional registers between the primary input and the node in each of the first and second circuit designs descriptions based on the recorded information. For example, in the event that the CAD tool has pushed more registers forward across the combinational gate than backward across the combinational gate, the CAD tool may insert a number of registers between the additional primary input and the node of the first version of the circuit design that is equal to the difference of forward minus backward pushed registers. As another example, in the event that the CAD tool has pushed more registers backward across the combinational gate than forward across the combinational gate, the CAD tool may insert a number of registers between the additional primary input and the node of the second, register retimed version of the circuit design that is equal to the difference of backward minus forward pushed registers.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of performing sequential equivalence checking aware register retiming operations is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method for operating circuit design computing equipment to perform register retiming, verification, and configuration of an integrated circuit, comprising:
   with the circuit design computing equipment, receiving a first circuit design description having primary inputs, primary outputs, and a combinational gate having an output port;
   with the circuit design computing equipment, performing register retiming on the first circuit design description to create a second circuit design description having the primary inputs, the primary outputs, and the combinational gate;
   augmenting the first and second circuit design descriptions in preparation for performing sequential equivalence checking, wherein the augmented first and second circuit design descriptions each have an additional primary output that is coupled to the respective output port of the combinational gate;
   performing verification on the augmented first and second circuit design descriptions by checking sequential equivalence at the additional primary output of each of the augmented first and second circuit, design descriptions;
   generating configuration data based on the register retiming and the verification; and
   storing the configuration data in configuration memory of the integrated circuit.

2. The method of claim 1, wherein performing register retiming on the first circuit design description further comprises:
   removing a register from the output port of the combinational gate; and
   inserting the register at an input port of the combinational gate.

3. The method of claim 2, wherein the first circuit design description includes a first multiplexer that is coupled to the input port of the combinational gate and a second multiplexer that is coupled to the first multiplexer, and wherein inserting the register at the input port further comprises:
   changing the configuration of the first multiplexer from selecting a first input signal to selecting a second input signal, wherein the first input signal is driven by the second multiplexer and the second input signal is driven by the register.

4. The method of claim 1, wherein performing register retiming on the first circuit design description further comprises:
   removing a register from an input port of the combinational gate; and
   inserting the register at the output port of the combinational gate.

5. The method of claim 4, wherein the first circuit design description includes a first multiplexer that is coupled to the input port of the combinational gate and a second multiplexer that is coupled to the first multiplexer, and wherein removing the register from the input port further comprises:

changing the configuration of the first multiplexer from selecting a first input signal to selecting a second input signal, wherein the first input signal is driven by the register and the second input signal is driven by the second multiplexer.

6. The method of claim 1, further comprising:
recording information about a register that is moved as a result of performing register retiming, wherein the information includes a move direction and a register type.

7. The method of claim 6, wherein the register type comprises a clock identifier and a polarity.

8. The method of claim 6, wherein the register type comprises a signal value stored in the register at initialization.

9. The method of claim 6, wherein augmenting the first and second circuit design descriptions further comprises:
inserting additional registers between the output port of the combinational gate and the additional primary output in each of the first and second circuit design descriptions based on the recorded information.

10. The method of claim 9, further: comprising:
disconnecting the output port of the combinational gate in each of the first and second circuit design descriptions from a given fanout node.

11. The method of claim 10, further comprising:
creating an additional primary input in each of the first and second circuit design descriptions; and
connecting the additional primary input in each of the first and second circuit design descriptions to the given fanout node in each of the first and second circuit design descriptions.

12. A method for operating a circuit design tool implemented on computing equipment to perform register retiming and configuration of an integrated circuit device, comprising:
receiving a first circuit design description that includes a register and a combinational gate, wherein the combinational gate in the first circuit design description has an input port and an output port;
performing a register retiming operation on the first circuit design description to create a second circuit design description that includes a register and a combinational gate, wherein the combinational gate in the second circuit design description has an input port and an output port;
inserting a first test port that is coupled to the output port of the combinational gate of the first circuit design description;
inserting a second test port that is coupled to the output port of the combinational gate of the second circuit design description;
checking sequential equivalence at the first and second test ports;
generating configuration data based on the register retiming operation and sequential equivalence checking; and
storing the configuration data in configuration memory of the integrated circuit device.

13. The method of claim 12, wherein checking the equivalence of the first and second test ports further comprises:
receiving a first signal from the combinational gate of the first circuit design description at the first test port;
receiving a second signal from the combinational gate of the second circuit design description at the second test port; and
performing a logical exclusive OR operation of the first and second signals.

14. The method of claim 12, wherein performing the register retiming operation on the first circuit design description further comprises:
moving the register from the input port to the output port of the combinational gate; and
recording information about the register, wherein the information includes clocking information and initialization information.

15. The method of claim 14, further comprising:
inserting an additional register between the output port of the combinational gate and the second test port in the second circuit design description, wherein the additional register and the register share a same clock connection and store a same signal value at initialization.

16. The method of claim 12, wherein performing the register retiming operation on the first circuit design description further comprises:
moving the register from the output port to the input port of the combinational gate; and
recording information about the register, wherein the information includes clocking information and initialization information.

17. The method of claim 16, further comprising:
inserting an additional register between the output port of the combinational gate and the first test port in the first circuit design description, wherein the additional register and the register share a same clock connection and store a same signal value at initialization.

18. Non-transitory computer-readable storage media for compiling a first circuit design description, comprising instructions for:
performing a retiming operation on the first circuit description, wherein the retiming operation moves a register across a combinational circuit to create a second circuit design description;
creating a first primary output in the first circuit design description and a second primary output in the second circuit design description;
connecting the first primary output to an output port of the combinational circuit in the first circuit design description;
connecting the second primary output to the output port of the combinational circuit in the second circuit design description;
performing sequential equivalence checking of the first and second primary outputs; and
generating configuration data for configuring an integrated circuit die based on the retiming operation and the sequential equivalence checking.

19. The non-transitory computer-readable storage media of claim 18, wherein performing the retiming operation further comprises instructions for:
removing the register from the output port of the combinational circuit; and
inserting the register at an input port of the combinational circuit.

20. The non-transitory computer-readable storage media of claim 18, wherein performing the retiming operation further comprises instructions for:
removing the register from an input port of the combinational circuit; and
inserting the register at the output port of the combinational circuit.

21. The non-transitory computer-readable storage media of claim 18, further comprising instructions for:

recording clocking and initialization information about the register; and creating an additional register based on the recorded clocking and initialization information.

22. The non-transitory computer-readable storage media of claim 21, further comprising instruction for:

coupling the additional register between the output port of the combinational circuit and the first primary output in the first circuit design description.

23. The non-transitory computer-readable storage media of claim 21, further comprising instruction for:

coupling the additional register between the output port of the combinational circuit and the second primary output in the second circuit design description.

* * * * *